April 27, 1965 TAKAO INUI 3,180,299
SHIP HULL FORM
Filed Jan. 26, 1961 5 Sheets-Sheet 1
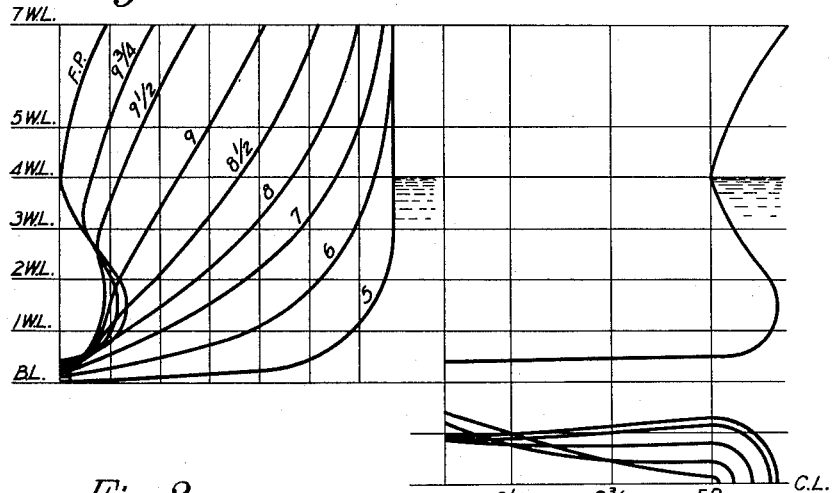
Fig. 1
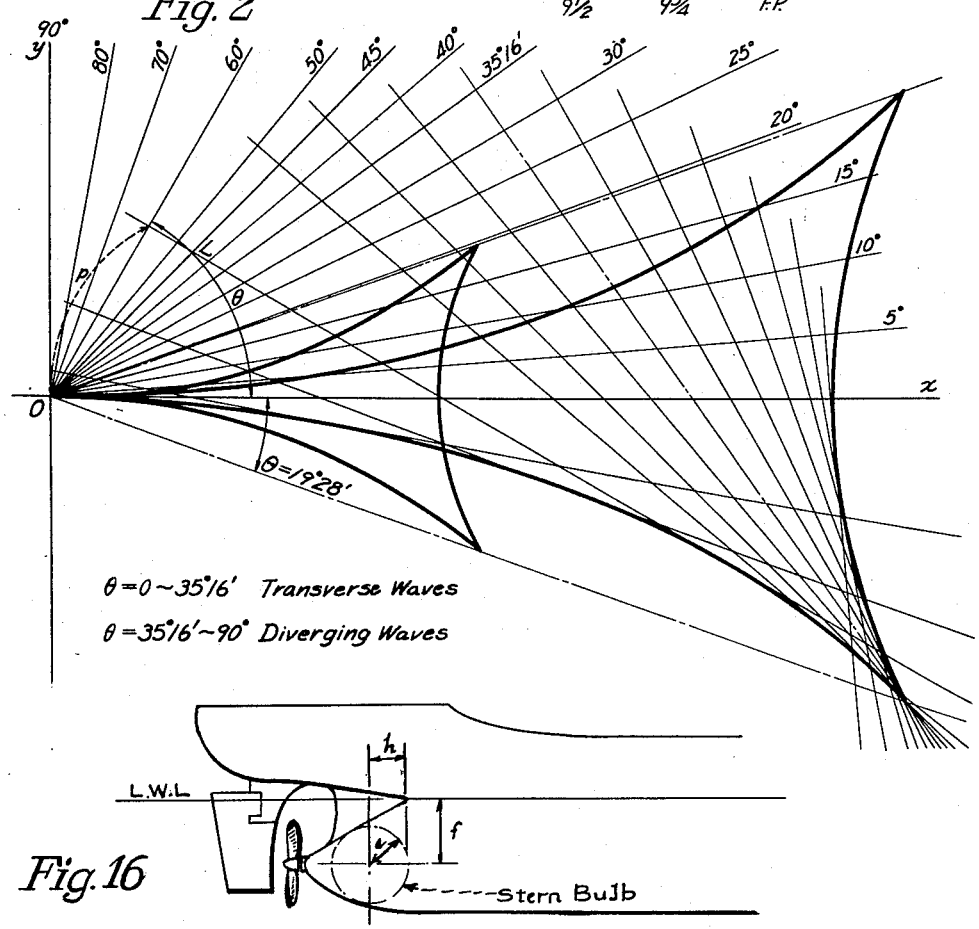
Fig. 2
$\theta = 0 \sim 35°16'$ Transverse Waves
$\theta = 35°16' \sim 90°$ Diverging Waves
Fig. 16

April 27, 1965  TAKAO INUI  3,180,299
SHIP HULL FORM
Filed Jan. 26, 1961  5 Sheets-Sheet 2

Measured and Calculated Wave-Making Resistances of Full Mathematical Model

April 27, 1965  TAKAO INUI  3,180,299
SHIP HULL FORM

Filed Jan. 26, 1961  5 Sheets-Sheet 5

Wave Profiles on the sides of Models with and without Bulb

United States Patent Office 3,180,299
Patented Apr. 27, 1965

3,180,299
SHIP HULL FORM
Takao Inui, 275 Kamiosaki Chojamaru, Shinagawa-ku, Tokyo, Japan
Filed Jan. 26, 1961, Ser. No. 85,027
Claims priority, application Japan, Feb. 1, 1960, 35/3,244; July 20, 1960, 35/31,771
9 Claims. (Cl. 114—56)

This invention relates generally to a ship hull form of the displacement type and more particularly to a configuration of the submerged portion of such ship hull.

A principal object of the invention is to provide a new and improved ship hull form of displacement type having a wave-making resistance substantially null at a predetermined speed thereof.

It is apparent that wave-making resistance will be substantially null provided that bow and stern waves produced by a moving ship would be fully eliminated. Also it is well known that, if a pair of plane waves equal in amplitude and having infinitely long crests are separated from each other by a distance equal to $(N+\frac{1}{2})$ times the wave-length thereof, where N is any integer, then the waves are fully cancelled out by each other.

However, a ship's wave is very complicated. Each of bow and stern waves includes two systems of transverse and diverging waves with the finite lengths of their crests increased proportionally to the traveling distances of the waves while the amplitudes of the waves are decreased as those distances are increased. For a long time it has been believed therefore that, because of the great complexity of the ship's waves it was impossible for them to be fully eliminated as in the case of plane waves above described. In other words, the fundamental concept previously predominate in the field of naval architecture is that, with a given displacement and a given speed of a ship improvements in a ship hull can only reduce wave-making resistance to a certain limit (or the minimum wave-making resistance) different from zero and that the hull can not be further improved so as to reduce the wave-making resistance thereof below that limit. In addition, it has been accepted that any increase in the displacement of a ship generally causes the wave-making resistance thereof to be increased more or less.

Therefore, an object of the invention is to fully eliminate bow waves and/or stern waves produced by a moving ship on the basis of a novel technical concept quite different from the common knowledge in the field of naval architecture.

In view of the abovementioned objects, the present invention resides in a ship hull form of the displacement type comprising a main ship hull adapted to produce a predetermined free wave pattern, and a bulb member mounted on at least one end of the main hull and adapted to produce a free wave pattern phased oppositely to the first-mentioned free wave pattern. The bulb member is positioned, shaped and dimensioned such that the amplitude functions $A(\theta)$ and $B(\theta)$ for elementary waves forming the two free wave patterns respectively are substantially equal to each other for every value of $\theta$ ranging from $$0 \text{ to } \frac{\pi}{2}$$

where $\theta$ denotes an angle between a direction of propagation of the free wave and the direction opposite to the direction of movement of the ship's hull.

In practicing the invention, the abovementioned bulb member may be fixedly or movably mounted to an end of the ship hull. With a movable bulb member, the wave-making resistance of the ship hull can be made null under any loading state of the ship.

Another object of the invention is to provide a device for manually or automatically controlling a position of a movable bulb member in accordance with a loading state of a ship.

The invention will be more readily apparent from the following detailed description made in conjunction with the accompanying drawings in which:

FIG. 1 is a graph illustrating, in body-plan, profile and half-breadth plan a bow portion of a ship hull constructed according to the teaching of the invention;

FIG. 2 is a plan view of free wave patterns produced by the ship hull;

FIGURE 16 is a side elevational view of a stern bulb according to the teaching of the invention.

Figure 3A:
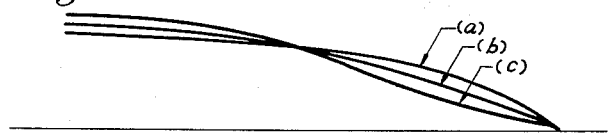
FIG. 3A is a plan view of various shapes of the water lines of a ship hull itself without a bulb.

As previously described, the invention uses a bulb member mounted on at least one end of a ship hull of a ship to thereby utilize interference between waves produced by the bulb member and the corresponding end of the ship hull. In this respect it may be considered as an improvement in a bulbous bow type of the ship hull previously used. A comparison of the invention with such a type of the ship hull will now be described.

The conventional known bulb has been merely used experimentally without understanding wave-making characteristics of a bulb mounted to a ship hull and even without appreciating a relationship between the main hull form and the wave-making characteristics thereof which is most important from the standpoint of the full utilization of the interference between two wave systems or a main hull wave system and an additional bulb wave system.

In the ship hydrodynamics of the prior art, there has been a misunderstanding that, with a ship hull including a bulbous bow and/or a bulbous stern it is generally impossible to fully eliminate bow waves and/or stern waves, or that the wave interference may be caused imperfectly at most. For example, a lot of model basin experiments on bulbous types showed that, with a constant displacement a reduction in wave-making resistance reached approximately 15% but did not exceed 20%.

On the contrary, the invention makes it actually possible to fully eliminate one or both of the bow and stern waves by using a bow bulb or a stern bulb or by using both of them. Namely, it ensures that perfect wave interference is caused. The term "perfect wave interference" used herein means a waveless state in which a pair of free waves equal in amplitude and opposite in phase are fully eliminated by superposing one of the waves on the other. Assuming for purposes of explanation, that a ship hull form does not include a parallel middle portion, a free wave pattern produced by such hull form consists of a bow wave system and a stern wave system without any shoulder wave system.

In general, a bow wave provides nearly 60 to 70% of the total wave-making resistance with the remainder resulting from a stern wave in the actual range of Froude numbers.

If it is also assumed that a hull of a ship without any bulb member—which is referred to hereinafter as a main hull—has a wave-making resistance of 100 then the main hull with a bow bulb according to the invention has a wave-making resistance reduced to from 30 to 40% of the resistance resulting in reduction of from 70 to 60% while the same with a stern bulb according to the invention has a wave-making resistance reduced to from 60 to 70% of the resistance resulting in reduction of from 40 to 30%. If the hull is provided with such bow and stern bulbs its resistance becomes substantially null or zero. That is, the wave-making resistance is caused to substantially disappear. It is to be noted that the main hull with a bulb member or members is increased in displacement and accordingly in loading capacity by a volume of the bulb member or members with the wave-making resistance greatly decreased.

For facilitating the understanding of the invention certain technological terms will now be described.

When a ship travels over the water surface water waves are produced. Assuming that the ship moves along the x-axis, in a system of coordinates, in the negative direction and that $\zeta(x, y)$ denotes an elevation of the water surface from the still water level at any point whose coordinates are $x$ and $y$ and at the instant under consideration, the elevation $\zeta(x, y)$ is represented by the expression.

$$\zeta(x,y) = \zeta_w(x,y) + \zeta_1(x,y) \quad (1)$$

where $\zeta_w(x, y)$ represents a free wave pattern and $\zeta_1(x, y)$ represents a local disturbance. As well known to those skilled in the art, the free wave patterns do not occur in the front of the ship and propagate from the bow of the ship to the rearward infinity while they vertically oscillate. The local disturbance is non-oscillatory and appears only in the vicinity of the ship. The amplitude of the disturbance is rapidly and monotonically decreased as its distance from the ship is increased.

Due to its physical properities, the local disturbance does not serve to transfer undulatory energy and hence only the free wave patterns contribute to the wave-making resistance of a ship in steady movement. In general, the free wave pattern consists principally of a bow wave system and a stern wave system, and wave systems produced by fore and aft shoulders of parallel portions of a ship have relatively small amplitudes. Therefore, the bow wave system differs from the stern wave system in that the former is affected little by the viscosity of water and this is of the most importance in discussing wave-making resistances of ships.

If an elongated body such as a ship hull is steadily moving over or beneath the water surface the fore half of the body will displace the portion of water surrounding the same. Therefore, such fore half of the body can be replaced by an array of continuously distributed hydrodynamic "sources." On the other hand, the aft half of the moving body tends to form a void immediately behind the same. This void will be immediately filled up with the portion of water surrounding it. Therefore, the aft half of the body can be replaced by an array of continuously distributed hydrodynamic "sinks."

For purposes of explanation, it is assumed that a point source submerged directly under the origin of the coordinate system at a depth $f$ from the water surface is moved at a constant speed $V$. A free wave pattern produced by such source rearwardly of the same is asymptotically represented by the following expression $$\zeta_{ws}(x, y) \sim \frac{mK_0}{\pi V} \int_{-\frac{\pi}{2}}^{\frac{\pi}{2}} \sec^3\theta \cdot \exp(-K_0 f \sec^2\theta) \cos(K_0 p \sec^2\theta) d\theta \quad (2)$$

referred to the coordinate system moving with the source where $K_0 = g/V^2$ ($g$ is the gravitational acceleration),
$m$ = the strength of the source or the total flux outwards across a small closed surface surrounding the point source per unit time,
$\theta$ = an angle between the x-axis and a direction of propagation of the wave, and
$p$ satisfies the expression $$p = x \cos \theta + y \sin \theta \quad (3)$$

The Expression 3 represents any of the straight lines shown in FIG. 2.

From a phase function $\cos(K_0 p \sec^2 \theta)$ it is seen that a wave number of sinusoidal plane waves propagating in a direction $\theta$ is $K_0 \sec^2 \theta$ with a wave velocity or a velocity of propagation being $V \cos \theta$. In this case, a point where any straight line L intersects the x-axis is moved along that axis at a velocity equal to $V$. Further, the plane wave has an amplitude represented by the expression $$A(\theta) = \frac{mK_0}{\pi V} \sec^3 \theta \cdot \exp(-K_0 f \sec^2 \theta) \quad (4)$$

The portion of the elevation $\zeta_{ws}$ caused from the free wave patterns produced by a moving point source is formed of the wave of the characters just above described incoming along every direction ranging from $$\theta = -\frac{\pi}{2} \text{ to } \theta = \frac{\pi}{2}$$

In fact, the wave pattern $\zeta_{ws}$ (or isophasal line) is known as Kelvin's wave and includes a transverse wave system and a diverging system. These wave systems are visible while the sinusoidal waves forming the wave patterns are invisible. It can be mathematically shown that both the transverse wave system and the diverging wave system correspond to envelopes of such waves equal in phase.

In general, it will be seen that, with a moving body symmetrical with respect to a direction of movement of the same, the body produces rearwardly thereof free wave patterns asymptotically expressed by the expression $$\zeta_w(x, y) \sim \int_{-\frac{\pi}{2}}^{\frac{\pi}{2}} A(\theta) \frac{\sin}{\cos} [K_0 \sec^2 \theta (\overline{x-x_0} \cos \theta + y \sin \theta)] d\theta \quad (5)$$

where $x_0$ is a point where the corresponding resultant wave originated.

A sinusoidal wave such as that above explained can be referred to as an "elementary wave" and $A(\theta)$ defined under the Expression 4 or appearing in the Expression 5 referred to as an amplitude function of the elementary wave.

It is well known that, with a moving body accompanied with free wave patterns represented by the Expression 5, the body has a wave-making resistance $R_w$ having the expression $$R_w = \pi p V^2 \int_0^{\frac{\pi}{2}} \{A(\theta)\}^2 \cos^3 \theta d\theta \quad (6)$$

where $p$ is the density of water.

It is to be understood that, if $A(\theta)$ in the Expression 5 represents an amplitude function associated with the resultant wave patterns produced by the entire of a ship hull rearwardly of its stern then $R_w$, the Expression 6, will represent the total wave-making resistance of the entire hull whereas if $A(\theta)$ referred represents an amplitude function associated with a bow or a stern wave system, the Expression 6 will represent only a wave-making resistance due to such wave system. In this connection, it is noted that the non-oscillatory or fundamental component of a wave-making resistance can be divided into two parts, one of which is provided by a bow wave system and the other of which is provided by a stern wave system.

*Phase relationship among free wave patterns due to a point source, a double source and an array of continuously distributed sources.*—In the case of a submerged sphere of a radius $a$ moving at a velocity $V$ with a depth $f$ of its center, the same can be replaced by a doublet source consisting of a combination of two equal and opposite sources at an infinitely small distance having an axis directed in the direction of its movement and a strength or moment $M$ represented by the expression $$M = 2\pi a^3 V \quad (7)$$

A free wave pattern due to the double source as just above described is similarly represented by the expression $$\zeta_{wD}(x, y) \sim - \frac{MK_0^2}{\pi V} \int_{-\frac{\pi}{2}}^{\frac{\pi}{2}} \sec^4 \theta \cdot \exp(-K_0 f \sec^2 \theta) \sin(K_0 p \sec^2 \theta) d\theta \quad (8)$$

Figure 4A:
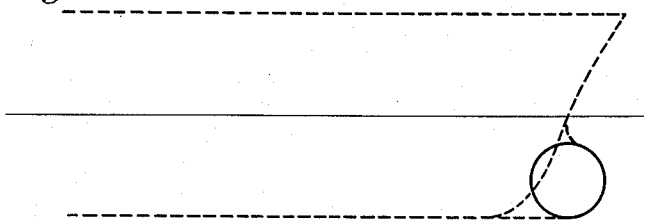
FIG. 4A is a side elevational view of a bulb member mounted to an end of a ship hull illustrated in by a dotted line.
Figure 4B:
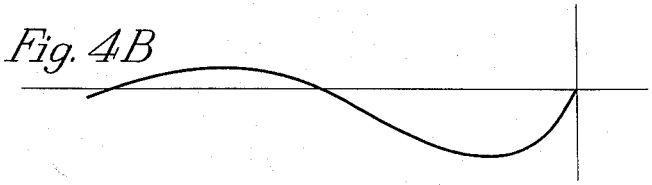
FIG. 4B is a diagram of a wave profile due to the bulb member shown in FIG. 4A.

By comparing the Expression 8 with the Expression 2, it will be seen that a free wave due to a double source leads, in phase a free wave due to a point source by 90° or a quarter wavelength. FIG. 4A shows schematically a fore half of a ship hull including mounted to the bow thereof a spherical bulb corresponding to the double source as above described and FIG. 4B illustrates schematically a wave profile due to such spherical bulb and on the side of the ship hull.

A phase of a free wave pattern produced by a main hull of a moving ship will now be explained. As in the previous cases, an elongated body with pointed ends such as a ship hull can be hydrodynamically represented by a combination of continuously distributed sources and sinks. Assuming that any elemental source or sink has its co-ordinates $(h, 0, -f)$ and that the combination of sources and sinks has a distribution function $m(h, f)$; the expression for a free wave pattern due to such sources and sinks can be readily obtained by substituting $m(h, f)$ for $m$ and $x-h$ for $x$ in the Expression 2.

If the distribution function is separable or $$m(h, f) = m_1(h) m_2(fV) \quad (9)$$

then the integration can be easily performed. It is noted that $m_1(h)$ and $m_2(f)$ have a physical bearing upon the shapes of water and frame lines of the main ship hull respectively.

Since a phase of a free wave due to the main hull in question is called an integral over the length L of the ship hull may be calculated. The calculation results in $$\int_0^L m_1(h \cos [K_0 \sec^2 \theta (\overline{x-h} \cos \theta + y \sin \theta)] dh$$
$$= S_F \sin [K_0 \sec^2 \theta (x \cos \theta + y \sin \theta)]$$
$$- C_F \cos [K_0 \sec^2 \theta (x \cos \theta + y \sin \theta)]$$
$$+ S_A \sin [K_0 \sec^2 \theta (\overline{x-L} \cos \theta + y \sin \theta)]$$
$$+ C_A \cos [K_0 \sec^2 \theta (\overline{x-L} \cos \theta + y \sin \theta)] \quad (10)$$

where $$S_F = \frac{m_F}{K_0 L \sec \theta} - \frac{m_F^{II}}{(K_0 L \sec \theta)^3} + \frac{m_F^{(IV)}}{(K_0 L \sec \theta)^5} - \cdots$$
$$C_F = \frac{m_F^{I}}{(K_0 L \sec \theta)^2} - \frac{m_F^{III}}{(K_0 L \sec \theta)^4} + \frac{m_F^{(V)}}{(K_0 L \sec \theta)^6} - \cdots$$
$$S_A = \frac{m_A}{K_0 L \sec \theta} + \frac{m_A^{II}}{(K_0 L \sec \theta)^3} - \frac{m_A^{(IV)}}{(K_0 L \sec \theta)^5} + \cdots$$
$$C_A = \frac{m_A^{I}}{(K_0 L \sec \theta)^2} - \frac{m_A^{III}}{(K_0 L \sec \theta)^4} + \frac{m_A^{(V)}}{(K_0 L \sec \theta)^6} - \cdots$$
(11)

and $m_F$, $m_A$; $m'_F$, $m'_A$; $m''_F$, $m''_A$—are magnitudes of the distribution function $m_1(h)$ and its successive derivatives $m'_1(h)$, $m''_1(h)$—at either end of the hull respectively. The reference characters F and A mean that the magnitude suffixed with the former character F is one on the bow of the ship hull while the magnitude suffixed with the latter is one on the stern of the same. For example, $m'_F$ is the magnitude of the first derivative on the bow and $m'_A$ is the magnitude of the same on the stern.

With the main ship hull symmetrical with respect to the transverse line passing through the center of the same, the distribution function $m_1(h)$ is an odd function referred to the coordinate system having its origin positioned at the center of the ship hull. According to this coordinate system $m_F = -m_A(>0)$, $m'_F = m'_A$, $m''_F = -m''_A$. . . . Therefore, $S_F = S_A(>0)$, $C_F = C_A$.

On the righthand side of the Expression 10 the first two terms result from a bow wave system whereas the remaining terms result from a stern wave system. Each system comprises generally a cosine wave as the second component plus a sine wave as the first component. The first two terms in the Expression 10 are converted into the expression $$H_F \sin [K_0 \sec^2 \theta (\overline{x - \Delta x_F} \cos \theta + y \sin \theta)] \quad (12)$$

where $$H_F^2 = S_F^2 + C_F^2 \quad (13)$$

and $$\tan (K_0 \Delta x_F \sec^2 \theta) = \frac{C_F}{S_F} \quad (14)$$

The remaining terms are represented by the expression $$H_A \sin [K_0 \sec^2 \theta (\overline{x - L + \Delta x_A} \cos \theta + y \sin \theta)] \quad (15)$$

where $$H_A^2 = S_A^2 + C_A^2 \quad (16)$$

and $$\tan (K_0 \Delta x_A \sec^2 \theta) = \frac{C_A}{S_A} \quad (17)$$

Figure 3B:
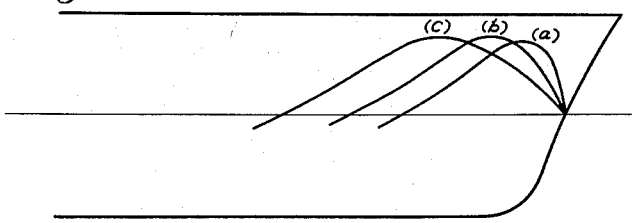
FIG. 3B is a side elevational view of a fore portion of a ship hull having any of the water lines illustrated in FIG. 3A and also schematically illustrates wave profiles of a bow wave for illustrating change in phase of the bow wave dependent upon the shape of the water lines shown in FIG. 3A.

$S_F$ and $S_A$ are always positive while $C_F$ and $C_A$ have their signs dependent upon the signs of $m'_F$ and $m'_A$. For example, for a full water line or a water line having a large angle of entrance (curve $a$ in FIG. 3A) $m'_F<0$ and $m'_A<0$. Therefore, $C_F<0$ and $C_A<0$. Thus $\Delta x_F$ and $\Delta x_A$ are negative. For a straight water line as shown at curve $b$ in FIG. 3A, $m'_F \simeq 0$ and $m'_A \simeq 0$ resulting in $\Delta x_F \simeq 0$ and $\Delta x_A \simeq 0$. Further, for a hollow water line or a water line having a small angle of entrance (curve $c$ in FIG. 3A) $\Delta x_F>0$ and $\Delta x_A>0$. FIG. 3B shows wave profiles occurring in the three cases just above explained for illustrating the change in phase of the wave.

Each of $\Delta x_F$ and $\Delta x_A$, however has a relatively small value not exceeding $0.06L$ where $L$ is a length of a ship hull. Especially, for small Froude numbers $F$ or $F<0.25$ (corresponding to $K_0L=1/F^2>16$), the ratios $C_F/S_F$ and $C_A/S_A$ are very low and accordingly $\Delta x_F \simeq 0$ and $\Delta x_A \simeq 0$. The Froude number is defined as $F=V/\sqrt{Lg}$ where $V$ represents the speed of the ship and $g$ is the gravitational acceleration.

It is here to be noted that the abovementioned results have been obtained neglecting the effect of an orbital motion of ship's waves and more particularly of the normal component of its velocity on the surface of the ship hull. In designing ship hulls, however it is necessary that this effect of higher order type should be compensated. In general, such effect occurs only on bow and stern portions resulting in the fact that the origin of the bow wave is shifted forwardly a distance equal to a few percent of a ship length.

Next a phase of a bulb wave will be described. It has been found that bulbs changed variously in shape and dimension draft-wise and/or beam-wise produce free wave patterns each always having a phase corresponding to that of a minus sine wave whose zero is passed through the origin of the wave.

For the foregoing it is appreciated that a free wave due to a bulb is substantially opposite in phase to a free wave due to a pointed end of a main ship hull. Further, it is to be understood that the free waves can be precisely opposite in phase to each other by properly combining a main hull form with bulb characteristics for any given speed and draft of a ship. This means that one of the conditions required for perfect wave interference or for the phase relationship between free waves due to a main ship hull and a bulb mounted thereto can be satisfied by the procedure thus far described.

*Condition for equality of amplitude*

The other condition for obtaining perfect wave interference will now be discussed. This leads to a problem as how to select a shape and dimension of a bulb and to combine a main ship hull form with the bulb or bulbs at a predetermined speed and draft of the ship. In the following discussion it is assumed that the two free wave systems due to the main hull and the bulb respectively are opposite in phase to each other.

For any given speed of a ship and any given draft thereof an amplitude function $B(\theta)$ of an elementary wave due to a bulb depends upon the shape and dimension of the bulb or the distribution of the corresponding doublet sources. For example, if the draft-wise distribution is represented by $M(f)$, then $$B(\theta) = \frac{K_0^2}{\pi V} \sec^4 \theta \int_{f_1}^{f_2} M(f) \exp(-K_0 f \sec^2 \theta) df \quad (18)$$

where $f_1$ and $f_2$ are the upper and lower extremities of the doublet distribution respectively. From the above it can be seen that the characteristics and total value of the amplitude function $B(\theta)$ are varied with the distribution $M(f)$.

Figure 7A:
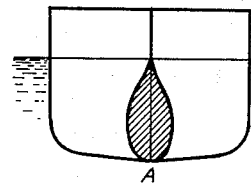
FIGS. 7A, 7B and 7C are front views of ship hulls including bulb members of different shapes shown in section.
Figure 7B:
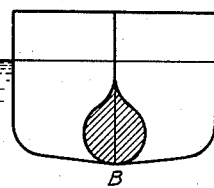
Figure 7C:
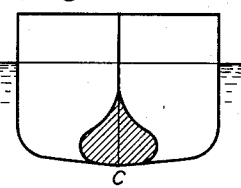
Figure 8:
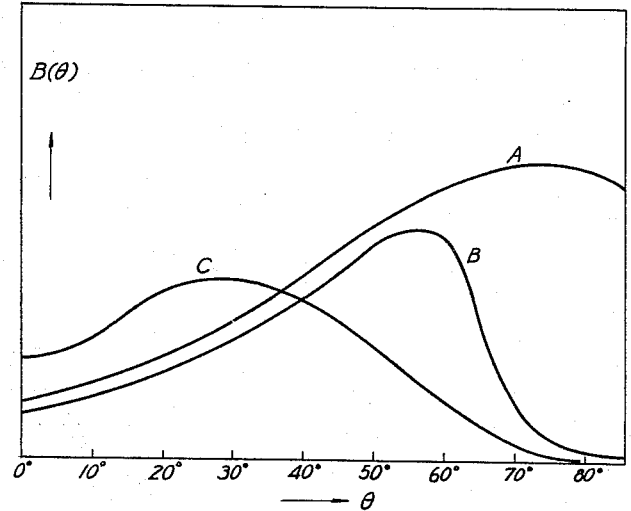
FIG. 8 is a graph schematically illustrating amplitude functions of elementary waves forming free wave patterns produced by the bulb members shown in FIGS. 7A, 7B and 7C respectively.

FIGS. 7A, 7B and 7C show in section different bulbs suitable for use with the invention and FIG. 8 shows graphs illustrating the amplitude functions associated with the bulbs of FIGS. 7A, 7B and 7C.

On the other hand, the amplitude functions for the bow and stern waves due to the main hull may be obtained by utilizing the Expressions 2, 10, 11, 12 and 15. Namely they are $$A_F(\theta) = H_F Z \quad (19)$$

$$A_A(\theta) = H_A Z \quad (20)$$

where $A_F(\theta)$ and $A_A(\theta)$ represent the amplitude functions for the bow and stern waves respectively and $$Z = \frac{mK_0}{\pi V} \sec^3 \theta \int_0^T m_2(f) \exp(-K_0 f \sec^2 \theta) df \quad (21)$$

where $T$ is the draft of the ship hull.

Figure 5A:
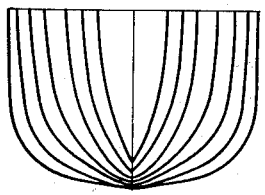
FIG. 5A is a front view of a main ship hull having U-shaped frames.
Figure 5B:
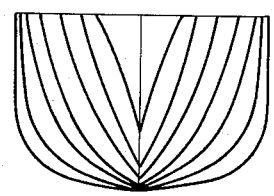
FIG. 5B is a front view of a main ship hull having V-shaped frames.
Figure 6:
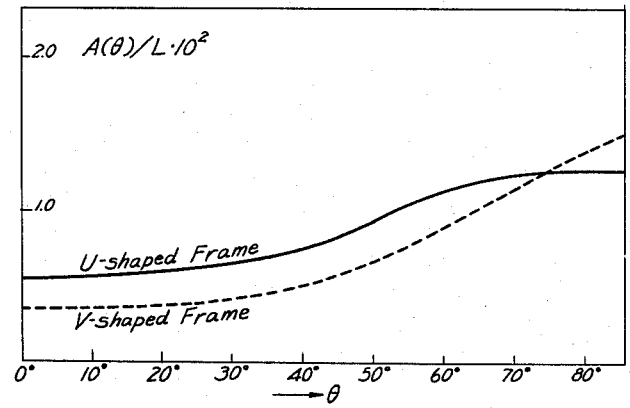
FIG. 6 is a graph illustrating amplitude functions of elementary waves forming free wave patterns produced by the main ship hulls of FIGS. 5A and 5B respectively.

FIG. 6 shows graphs illustrating by way of example such amplitude functions associated with the U-shaped type and V-shaped type of main ship hull shown in FIGS. 5A and 5B respectively.

If the shape and dimension of a bulb or distribution function $M(f)$ of an array of vertically or draft-wise distributed doublet sources could be chosen so as to satisfy the relationship $$B(\theta) = A_F(\theta) \text{ or } B(\theta) = A_A(\theta) \quad (22)$$

for every value of $\theta$ ranging from $$0 \text{ to } \frac{\pi}{2}$$

then the corresponding bow or stern wave system can be fully eliminated.

In this case, it is to be noted that the Expression 22 is not required to be strictly held for every value of $\theta$. The reason for this is as follows: A wave-making resistance $R_{WF1A}$ due to only a bow (or stern) wave system may be represented by the expression $$R_{WF_1A} = \pi p V^2 \int_0^{\frac{\pi}{2}} \{A_{F_1A}(\theta) - B(\theta)\}^2 \cos^3 \theta \, d\theta \quad (23)$$

since the integrand appearing in the above expression comprises a factor $\{A_{F_1A}(\theta) - B(\theta)\}^2$ multiplied by $\cos^3(\theta)$, the wave-making resistance will approach zero as $\theta$ approaches $90°$ even if the difference between $A_F$, $A(\theta)$ and $B(\theta)$ would not be null or zero. Therefore, perfect wave interference can be substantially attained. In other words, the condition defined under the Expression 22 is required to be more precisely fulfilled for a transverse wave system corresponding to $\theta=0°\sim35°\,16'$ than for a diverging wave system corresponding to $\theta=35°16'\sim90°$.

A specific experiment on a ship model will now be described. A model used has its main hull form corresponding to an array of continuously distributed sources represented by the expression $$m(h,f) = a_1 \sin \frac{\pi}{2}(1-h) \cdot V$$

for $$h=0 \text{ (on the bow)} \sim 2 \text{ (on the stern)}$$

and $$f = -t \sim 0 \quad (24)$$

where $$t = \frac{2T}{L}$$

with $V$ and $T$ representing the speed and draft of the hull form.

This type of the model has no shoulder wave and a free wave due to its bow is represented by the expression $$\zeta_{WF} \sim \frac{a_1 L}{\pi} K_0 L \int_{-\frac{\pi}{2}}^{\frac{\pi}{2}} \frac{U(K_0 T, \theta) \sec^2 \theta}{(K_0 L \sec \theta)^2 - \pi^2} \sin(K_0 L p' \sec^2 \theta) d\theta x > 0 \quad (25)$$

where $U(K_0 T, \theta) = 1 - \exp(-K_0 T \sec^2 \theta)$ and $p' = (x \cos \theta + y \sin \theta)/L$. As in the previous case, the coordinate system is fixed to the model which, in turn is moving along the x-axis in the negative direction with the origin of the coordinate system positioned on the bow of the model.

On the other hand, an isolated doublet source positioned beneath the origin at a depth $f$ with its axis directed in the negative direction of the x-axis produces a free wave represented by the expression $$\zeta_{WD} \sim -\frac{MK_0^2}{\pi V}\int_{-\frac{\pi}{2}}^{\frac{\pi}{2}} \sec^4\theta \exp(-K_0 f \sec^2\theta) \sin(K_0 \sec^2\theta \cdot x \cos\theta + y \sin\theta) \, d\theta x > 0 \qquad (26)$$

where M is the strength of the doublet source. As previously set forth, a doublet source is equivalent to a sphere. Assuming that the sphere has a radius $a_0$ the strength M in the instant example is equal to $2\pi a_0^3 V$.

When the model is combined with bulbs disposed on the bow and the stern respectively each of which is equivalent to the abovementioned isolated doublet source, free waves due to such bulbs are precisely opposed in phase to the bow and stern waves respectively.

Figure 12:
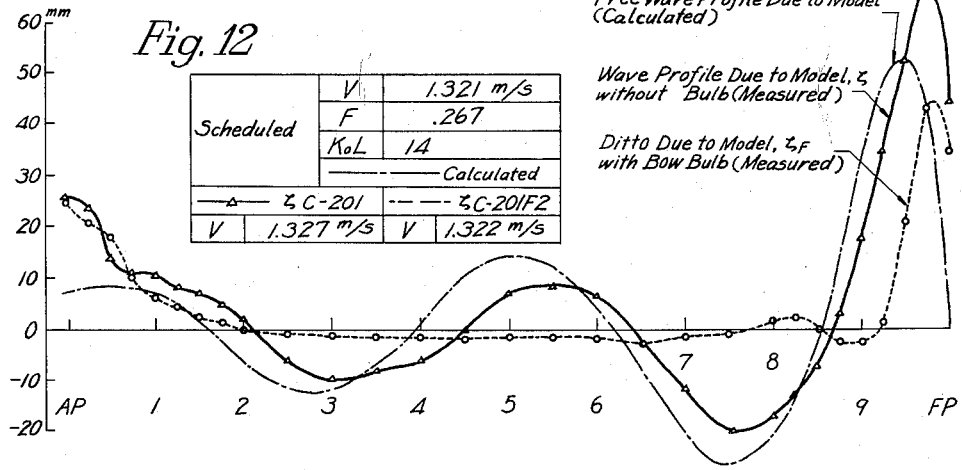

FIG. 12 shows measured wave profiles due to the model alone and the model including the bow bulb and on the side of the model, together with a calculated wave profile due to the model alone and on the side of the same. The difference between the two wave profiles measured can be considered to result from a wave profile due to the bulb which, in turn agrees closely with a theoretical one. It will be noted that, owing to an orbitate motion, the calculated wave profile is somewhat shifted toward the stern. The position of the bulb is determined to compensate for this shift.

The bulb combined with the hull behaves in double modes. The mounted bulb serves to increase the volume of the ship hull and hence behaves spatially in the same mode as does the main hull. However, the bulb serves to decrease the wave-making resistance while increase in the main hull serves to increase the same. Therefore, the mounted bulb behaves in the reverse mode as does the main hull. This positively indicates the merit of the bulb which has hitherto been explained merely superficially and ideologically.

Also, amplitude functions of elementary waves associated respectively with the bow wave and the wave due to the bow bulbs are respectively represented by the expressions $$A_F(\theta) = \frac{a_1 L}{\pi} K_0 L \frac{U(K_0 T_1 \theta) \sec_2 \theta}{(K_0 L \sec\theta)^2 - \pi^2} \qquad (27)$$

and $$B_F(\theta) = \frac{MK_0^2}{V\pi} \sec^4\theta \exp(-Kf \sec^2\theta) \qquad (28)$$

Figure 13:
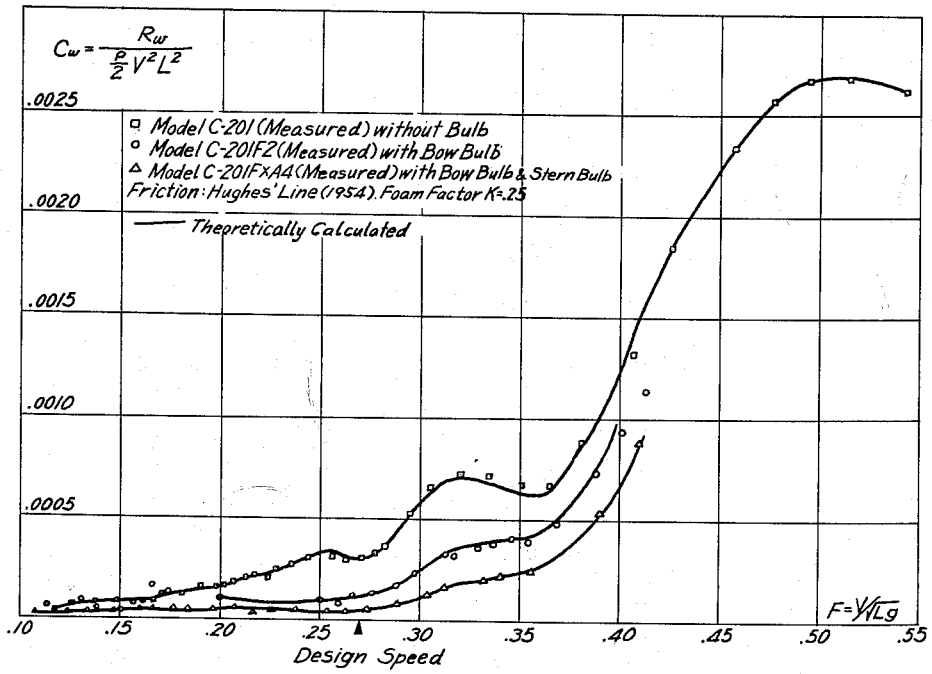
FIGS. 12 and 13 is a graph illustrating the advantages of the invention.

With both Expressions 27 and 28 equal to each other for every value of $\theta$ ranging from 0 to 90° and more particularly for small values of $\theta$ as previously described, experimental results as to wave-making resistance has been obtained illustrating in FIG. 13. In FIG. 13 it is to be noted that the measured magnitudes are designated the symbols □, ○ and △ and that plotted curves are theoretical. As shown, the experimental results agree substantially with the theoretical ones. It is seen that, with the model including a bow bulb and a stern bulb, a wave-making resistance is null at a speed corresponding to $F=0.27$ and accordingly the situation of the "Waveless" or "Wave-making resistanceless" has been attained.

Figure 9:
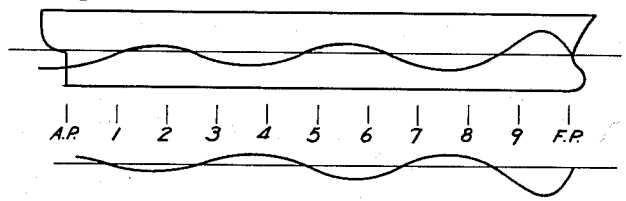
FIG. 9 is a schematic side view of a ship hull including the bow portion shown in FIG. 1 and wave profiles of a bow wave produced by the main hull thereof and a free wave produced by the bulb portion shown in FIG. 1.
Figure 10:
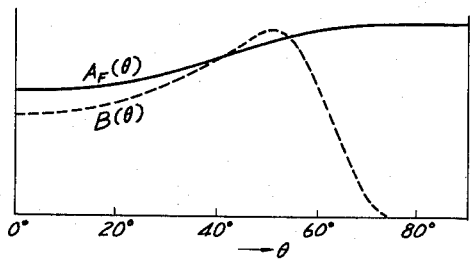
FIG. 10 is a graph illustrating amplitude functions of elementary waves forming a bow wave due to the main ship hull and a free wave due to the bulb member shown in FIG. 1 plotted against the direction of propagation of the free wave.
Figure 11:
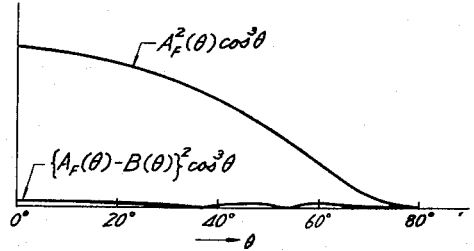
FIG. 11 is a graph illustrating integrands appearing in the integrals of bow wave-making resistances calculated on the bases of the wave profiles and the functions shown in FIGS. 9 and 10 respectively and in conjunction with a ship hull including a bulb member according to the invention and the same not including such a bulb member.

Now referring back to FIG. 1 of the drawing, there is illustrated in various sections a bow portion of a ship hull including mounted thereto a bulb which is constructed according to the teaching of the invention. The bulb is designed to effect perfect wave interference at a speed corresponding to $F=0.250$. Free waves produced by the bow of the main hull including no bulb and by the bulb respectively have phase relationships as shown in FIG. 9 and amplitude functions $A(\theta)$ and $B(\theta)$ as illustrated in FIG. 10 respectively. FIG. 11 illustrates integrands appearing in the Expression 6 representing a wave-making resistance due to the bow wave and in the Expression 23 also representing a wave-making resistance due to the bulb referred to. Since an area confined by the curve and the axis of abscissas and ordinate in FIG. 11 is proportional to a magnitude of wave-making resistance it will be seen that the ship hull including the bow portion illustrated in FIG. 1 will provide substantially null wave-making resistance.

In general, as speed of a ship is increased, an amplitude function $A(\theta)$ due to the main hull alone is increased for all values of $\theta$. On the other hand, an amplitude function $B(\theta)$ due to a bulb will reach its maximum magnitude when the Froude number F is very small, for example approximately 0.10, and thereafter is monotomically decreased with Froude number. Therefore, the lower a designed speed of a ship the more readily the condition for equality of amplitude (22), may be satisfied. The reason for this is that a relatively small volume or dimension of a bulb causes the Expression 22 to be held. For example, in the case of a super-tanker having a designed speed corresponding to $F=0.18\sim0.19$, a bulb according to the invention is required to have a volume substantially equal to 0.6 to 0.8 percent of the total displacement thereof. However, a volume of a bulb required is increased as a designed Froude number is increased and for example it may be 2 to 3 percent and 5 percent or more of a ship displacement at $F=0.25$ and $F=0.30$ respectively. It is to be noted that the above-mentioned figures depend upon a ship hull form and that they fully meet the requirement for perfect elimination or equality of amplitude. Under certain circumstances, the volume of the bulb may be conveniently varied within certain limits whereby the condition for equality of amplitude will be approximately fulfilled. For example, a bulb may have its volume adapted to make the magnitude of the amplitude function $B(\theta)$ thereof equal to 70 percent of that of an amplitude function $A(\theta)$ of a main hull with which the bulb is to be combined. In this case, the remaining bow wave will have an amplitude equal to $A(\theta) - B(\theta) = 0.30 A(\theta)$ and a wave-making resistance due to the same is reduced to $0.3^2$ or 9 percent of its original magnitude and indeed is less than a tenth thereof. In other hands, the wave-making resistance is reduced to $$0.60 \times 0.09 + 0.40 \cong 0.45$$

times the original one, assuming that a ratio of the wave-making resistance due to the bow wave to that of the stern wave is 60:40.

This invention can be advantageously applied to a stern of a ship hull as illustrated in FIG. 16. In the illustration the stern bulb has a radius $a$ and its center is immersed a distance $f$ below the loading water line. The center of the bulb projects a distance $h$ aft of the intersection of the water line and the ship's counter. In general, the effect of water-viscosity on a wave-making resistance is not negligible on a stern of a ship hull. Therefore, expressions associated with waves due to the stern of the main hull as well as to a stern bulb must be somewhat modified. Namely, an amplitude reduction factor which is less than unity and a phase correction factor which is greater than zero must be considered. It should be noted that, if a stern bulb is too large, a boundary layer of water stream may be separated from the associated surface of a ship hull resulting in appreciable increase in viscous resistance of the ship. In such a case, it is preferable to use a stern bulb having a volume somewhat insufficient to precisely fulfill the condition for equality of amplitude. Further, a pump, jet means or the like may be conveniently used to prevent the boundary layer of water stream from separating from a surface of a ship hull. The stern bulb of the invention as properly disposed serves not only to reduce wave-making resistance but also provides means for improving the propulsive efficiency of a screw propeller by making the peripheral distribution of the wake within a propeller disk more uniform.

In the foregoing description it has been assumed that a bow or stern bulb as to its position, shape and dimension is fixed with respect to a ship hull with which the bulb is combined. This type of bulb is most effective in the case where a ship is substantially in a constant loading state. More particularly, main hull characteristics can be combined with bulb characteristics provided by the teaching of the invention to thereby fully eliminate a bow or stern wave resulting in the provision of a ship hull form having a wave-making resistance actually null at the designed speed and drift.

However, there are ships of the type in which their loading states may vary widely. In such a ship it is impossible to cause any fixed bulb or bulbs to perform perfect wave interference throughout the range of variable loading for the reasons which will now be described.

A variation in the loading state of a ship affects principally an amplitude function of a free wave due to the main hull and more particularly the function Z in the Expression 21. The integral on the righthand side of the same has its upper limit T variable with the draft of the ship. For example, as the draft is increased or the full loading is approached the magnitude of T and accordingly of Z is increased whereas a decrease in the draft or a shallower loading reduces the magnitude of T and accordingly of Z.

Similarly, variation in the loading state of a ship changes the characteristics of a bulb wave. For purposes of explanation it is assumed that a bulb has its characteristics represented by an isolated doublet source having a strength M. The expression for a free wave pattern due to such bulb is the Expression 8 as previously explained. The depth $f$ of its center is increased in a deep draft state whereas it is decreased in light loading state. Since the integral on the righthand side of the Expression 8 contains an exponential function $\exp(-K_0 f \sec^2 \theta)$, it is decreased as the depth $f$ is increased and vice versa.

In summary, a decrease in a draft of the ship with a fixed bulb effects a decrease in the amplitude function $A(\theta)$ of the main hull and an increase in the amplitude function $B(\theta)$ of the bulb. This increase in the function $B(\theta)$ results clearly from decrease in the displacement of the main hull and in the depth of the bulb's center.

Therefore, if the condition for equality of amplitude would be fulfilled or $A(\theta) = B(\theta)$ in a full loading state then $B(\theta) > A(\theta)$ in light loading state. This means that the condition for equality of amplitude can not be fulfilled in the light loading state at the same speed.

Accordingly, it will be understood that, with a ship varying widely in its loading state, the bulb of the fixed type as previously described can not always cause perfect wave interference at any draft and the designed speed.

The invention also is contemplated to cause perfect wave interference in the case of a ship varying widely in its loading state. For this purpose a bulb of the character previously described is constructed and arranged such that it is variable in position and/or shape and/or dimension in accordance with loading state of a ship. For example, a bulb of the character described may manually or automatically effect vertical movement with respect to a main ship hull in accordance with loading state thereof.

Figure 14:
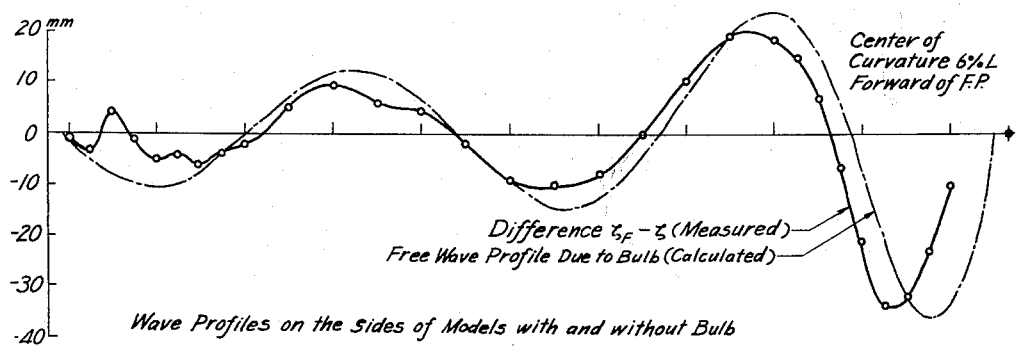
FIG. 14 is a longitudinal section of a bow portion of a ship hull illustrating another embodiment of the invention.
Figure 14:
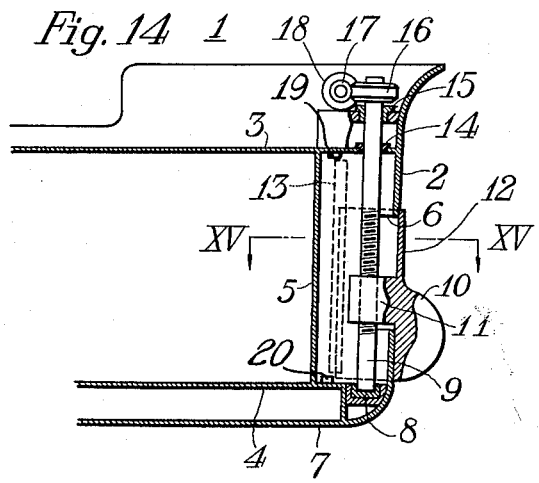
Figure 15:
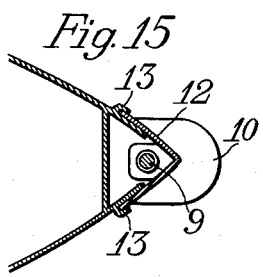
FIG. 15 is a section taken along the line XV—XV of FIG. 14.

Referring now to FIGS. 14 and 15 of the drawings, there is illustrated one form of the invention, in which a bow bulb of the character described is movably mounted to a main hull. Adjacent to a bow 2 of a main hull 1 a water-tight bulkhead 5 is provided between decks 3 and 4 to provide a bow space adjoining the bow. The bow 2 also includes a vertical opening 6 formed therein. The lower portion of the bow space or a hull bottom 7 is provided with a lower bearing 8 adapted to support a lower end of a screwed shaft 9.

According to the invention the bow 2 is provided on its outside with a bulb 10 of the character described which, in turn includes a leg portion or extension 11 formed on its rear surface. The leg portion 11 extends through the opening 6 into the bow space and engages the screwed shaft 9 for vertical movement whereby the bulb 10 is in intimate contact with the outer surface of the bow and slidable on the same. The bulb 10 includes a plate-like cover 12 for closing that portion of the opening 6 not covered with the bulb 10. The cover 12 may be supported on its lateral edges by guide members 13 formed, for example on the main hull 1 as illustrated in FIG. 15.

The threaded shaft 9 extends through the leg portion 11 of the slidable bulb 10 as above explained and then passed upwardly through a packing gland 14 disposed on the deck 3 until it is supported to an upper bearing 15. The shaft 9 includes mounted to the upper end thereof a worm wheel 16 meshing a worm 17 which, in turn may be driven by an electric motor 18.

FIG. 14 illustrates the bulb 10 in its end position corresponding to the lower limit of its movement range. The bulb 10 is in the position shown when the ship hull is in the lightest loading state. If the hull is in its full loading state, the bulb 10 can be moved to the other end position corresponding to the upper limit of its movement range. The bulb 10 may be suitably moved to its intermediate position in accordance with the loading state of the ship hull. The movement of the bulb is effected by a motor 18 through the threaded shaft 9. In this connection it is noted that the main body of the bulb 10 and its extension 11 surely close the opening 6 to thereby permit water to enter only the bow space to minimize resistance provided by the ship.

Instead of the threaded shaft illustrated, hydraulic means may be used to drive the bulb. It is to be understood that, in order to prevent any possible damage or overload of the drive resulting from the rotation of the motor in the same direction at the instant the slidable bulb has reached either end position of the range within which the same can be moved, an electrical circuit for the motor may include connected therein two limit switches 19, 20 adapted to be actuated as the bulb reaches either of its end positions within a given range of travel. This arrangement is very advantageous because it can prevent any trouble due to incorrect operation.

From the foregoing it is apparent that the present invention has provided a ship hull form causing perfect wave interference regardless of whether the loading state of the ship is always constant or widely variable.

While the invention has been described in conjunction with preferred embodiments thereof it is to be understood that the invention should not be limited to such embodiments and that numerous modifications and changes can be made without departing from the spirit and scope of the invention.

What I claim is:

1. A ship hull form of displacement type comprising a main ship hull capable of producing a free bow wave pattern $\zeta_{wF}$ represented by the expression $$\zeta_{wF} \sim \frac{a_1 L}{\pi} K_0 L \int_{-\frac{\pi}{2}}^{\frac{\pi}{2}} \frac{[1 - \exp(-K_0 T \sec^2 \theta)]}{(K_0 L \sec \theta)^2 - \pi^2} \sin(K_0 L p' \sec^2 \theta) \, d\theta x > 0$$

and a bulb of approximately spherical shape mounted on the bow of the main hull submerged in operation to produce a free bulb wave pattern $\zeta_{wD}$ represented by the expression $$\zeta_{wD} \sim -\frac{MK_0^2}{\pi V}\int_{-\frac{\pi}{2}}^{\frac{\pi}{2}} \sec^4\theta \exp(-K_0 f \sec^2\theta)\sin(K_0\sec^2\theta\cdot x\cos\theta + y\sin\theta)d\theta x > 0$$

the bow wave pattern being formed of elementary waves having amplitude function $A(\theta)$ $$A(\theta) = \frac{a_1 L}{\pi}K_0 L \frac{[1-\exp(-K_0 T\sec^2\theta)]}{(K_0 L\sec\theta)^2 - \pi^2}\sec^2\theta$$

the bulb wave pattern being formed of elementary wave having their amplitude function $B(\theta)$ $$B(\theta) = \frac{MK_0^2}{\pi V}\sec^4\theta \exp(-K_0 f\sec^2\theta)$$

where:

$L$=length of main hull
$T$=draft of ship hull
$V$=speed of ship hull
$f$=depth of center of bulb
$K_0$=gravitational acceleration/square of ship speed
$\theta$=angle between direction of propagation of free wave and direction opposite to direction to move ship
$p'=(x\cos\theta + y\sin\theta)L$
$a_1$=constant dependent upon main hull form
$M$=constant dependent upon radius $a_0$ of spherical bulb and equal to $2\pi a_0^3 V$ said bulb being arranged to cause the two free wave patterns $\zeta_{wF}$ and $\zeta_{wD}$ to be precisely opposite in phase to each other and the functions $A(\theta)$ and $B(\theta)$ are substantially equal to each other for every value of $\theta$ ranging from $$0 \text{ to } \frac{\pi}{2}$$

2. A ship hull form of displacement type comprising a main ship hull capable of producing a predetermined free wave pattern, and a bulb member mounted on at least one end of the main hull to produce a free wave pattern phased oppositely to the first-mentioned free wave pattern, said bulb member being positioned, shaped and dimensioned such that amplitude functions $A(\theta)$ and $B(\theta)$ for elementary waves forming the two wave patterns respectively are substantially equal to each other for every value of $\theta$ ranging from $$0 \text{ to } \frac{\pi}{2}$$

$\theta$ denoting an angle between a direction of propagation of the free wave and the direction opposite to the direction to move the ship hull, wherein said bulb member is mounted to the end of the main hull for draft-wise movement.

3. A ship hull form of displacement type comprising a main ship hull capable of producing a predetermined free wave pattern, and a bulb member mounted on at least one end of the main hull to produce a free wave pattern phased oppositely to the first-mentioned free wave pattern, said bulb member being positioned, shaped and dimensioned such that amplitude functions $A(\theta)$ and $B(\theta)$ for elementary waves forming the two wave patterns respectively are substantially equal to each other for every value of $\theta$ ranging from $$0 \text{ to } \frac{\pi}{2}$$

$\theta$ denoting an angle between a direction of propagation of the free wave and the direction opposite to the direction to move the ship hull, wherein said bulb member includes a peripheral portion slidably engaged to an end portion of the main hull on which said bulb member is mounted, and including means for maintaining said peripheral portion of said bulb member in intimate contact with said end portion of the main hull, and means including an electric motor for draft-wise displacement of said bulb member on said end portion of the main hull.

4. A ship hull form of displacement type comprising a main ship hull capable of producing a predetermined free wave pattern, and a bulb member mounted on at least one end of the main hull to produce a free wave pattern phased oppositely to the first-mentioned free wave pattern, said bulb member being positioned, shaped and dimensioned such that amplitude functions $A(\theta)$ and $B(\theta)$ for elementary waves forming the two wave patterns respectively are substantially equal to each other for very value of $\theta$ ranging from $$0 \text{ to } \frac{\pi}{2}$$

$\theta$ denoting an angle between a direction of propagation of the free wave and the direction opposite to the direction to move the ship hull, wherein said bulb member includes a peripheral portion slidably engaged with an end portion of the main hull on which said bulb member is mounted, means for maintaining said peripheral portion of said bulb member in intimate contact with said end portion of the main hull, means including an electric motor for draft-wise displacement of said bulb member on said end portion of the main hull, and a limit switch at either end of a range within which said bulb member can be displaced, said limit switches being arranged to be actuated by the bulb member when said bulb member reaches either end of said range of travel.

5. In combination, a displacement vessel hull form having a predetermined geometry for developing a known first free wave system comprising an aggregation of waves of at least two dimensions and having given amplitudes and phases, means defining a configured projection below the waterline of said hull extending outwardly from an end portion of said hull to develop in operation in a submerged condition and with said hull form being underway at a speed and displacement at which said first wave system is developed, a second free wave system comprising an aggregation of waves of at least two dimensions and having an opposite phase and substantially equal amplitude to respective corresponding waves in said first system of waves and interfering with said corresponding waves of said system to cancel said corresponding waves, thereby to reduce the wave-making resistance of said hull form due to said first wave system substantially to zero.

6. In a combination according to claim 5, in which said projection comprises a bulbous projection having surfaces for developing in operation a pattern of three dimensional waves within said second system in which said waves comprise waves diverging from the path of travel of said hull and waves transverse to said path of travel.

7. In combination, a displacement vessel hull form having a predetermined geometry for developing a known first free wave system comprising an aggregation of waves of at least two dimensions and having given amplitudes and phases, means defining a configured projection comprising a wave-forming bulbous body below the waterline of said hull extending outwardly from the bow of said hull to develop in operation in a submerged condition and with said hull form being underway at a speed and displacement at which said first wave system is developed, a second free wave system comprising an aggregation of waves of at least two dimensions and having an opposite phase and substantially equal amplitude to respective corresponding waves in said first system of waves and interfering with said corresponding waves of said system to cancel said corresponding waves, thereby to reduce the wave-making resistance of said hull form due to said first wave system substantially to zero.

8. In combination, a displacement vessel hull form having a predetermined geometry for developing a known first free wave system comprising an aggregation of waves of at least two dimensions and having given amplitudes and phases, means defining a configured projection comprising a wave-forming bulbous body below the waterline of said hull extending outwardly from the stern of said hull to develop in operation in a submerged condition and with said hull form being underway at a speed and displacement at which said first wave system is developed, a second free wave system comprising an aggregation of waves of at least two dimensions and having an opposite phase and substantially equal amplitude to respective corresponding waves in said first system of waves and interfering with said corresponding waves of said system to cancel said corresponding waves, thereby to reduce the wave-making resistance of said hull form due to said first wave system substantially to zero.

9. In combination, a displacement vessel hull form having a predetermined geometry for developing a known first free wave system comprising an aggregation of waves of at least two dimensions and having amplitudes and phases, means defining a configured projection below the waterline of said hull extending outwardly from an end portion of said hull to develop in operation in a submerged condition and with said hull form being underway at a speed and displacement at which said first wave system is developed, a second free wave system in the same general pattern as said first system and comprising an aggregation of waves of at least two dimensions and having an opposite phase and substantially equal amplitude to respective corresponding waves in said first system of waves and disposed within said second system for interfering with said corresponding waves of said system to cancel said corresponding waves, thereby to reduce the wave-making resistance of said hull form due to said first wave system substantially to zero, the last-mentioned means comprising a bulbous projection movably mounted for vertical movement along said end portion of said hull, means to adjust the vertical position of said bulbous projection to variably position the depth of its immersion center in dependence upon the draft of said end portion.

References Cited by the Examiner

UNITED STATES PATENTS

| 1,261,168 | 4/18 | Sachar | 114—126 |
| 2,032,597 | 3/36 | Shaw. | |
| 2,119,333 | 4/40 | Dunklin | 114—219 X |
| 2,984,197 | 5/61 | Bader | 114—66.5 |

FOREIGN PATENTS

| 880,165 | 12/42 | France. |
| 956,241 | 7/49 | France. |
| 1,369 | 3/83 | Great Britain. |

OTHER REFERENCES

Pages 102–106 of Principles of Naval Architecture, vol. II, Eighth printing, by Henry E. Rossell and Lawrence B. Chapman, 1949.

MILTON BUCHLER, *Primary Examiner.*